Figure 1:
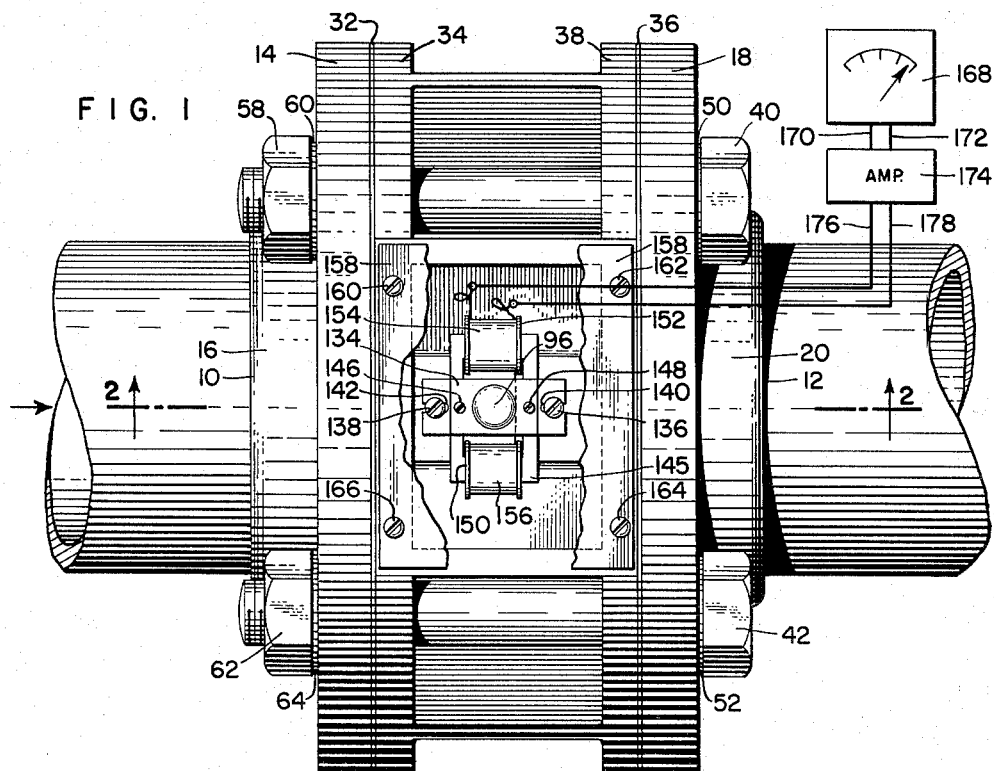

March 30, 1965 L. A. MEDLAR 3,175,399
FLUID FLOW MEASURING APPARATUS
Filed April 19, 1962 5 Sheets-Sheet 1

INVENTOR.
LEWIS A. MEDLAR
BY *Arthur H. Swanson*
ATTORNEY.

March 30, 1965
L. A. MEDLAR
3,175,399
FLUID FLOW MEASURING APPARATUS
Filed April 19, 1962
5 Sheets-Sheet 2
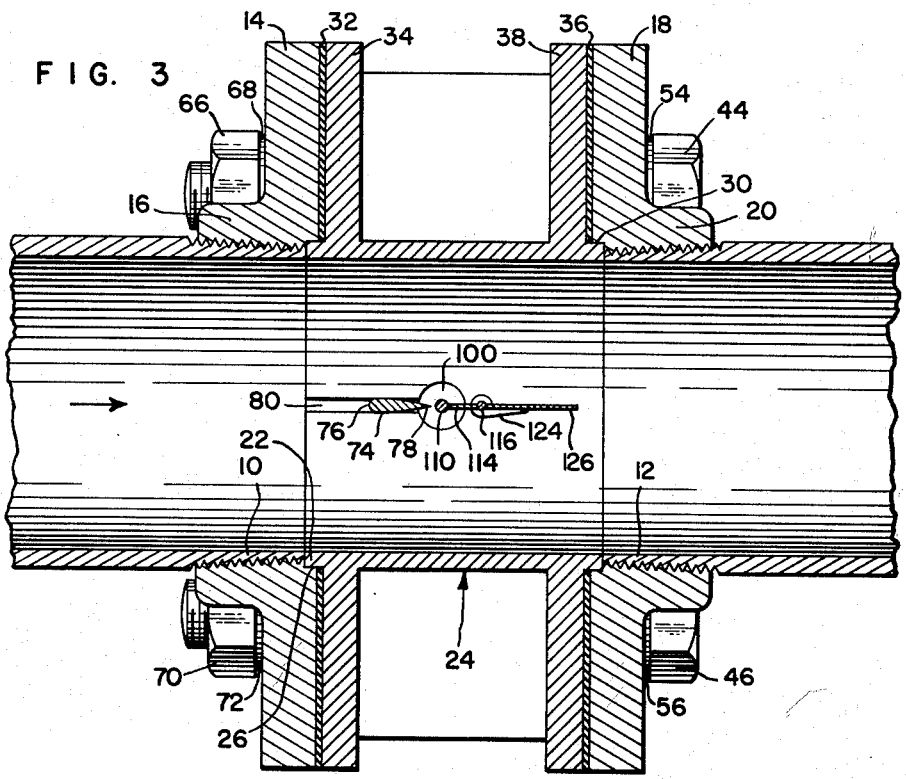
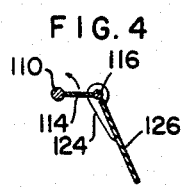
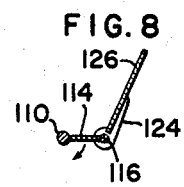
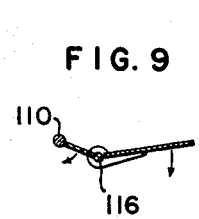
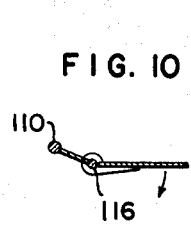
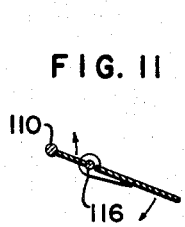
INVENTOR.
LEWIS A. MEDLAR
BY Arthur H. Swanson
ATTORNEY.

March 30, 1965 L. A. MEDLAR 3,175,399
FLUID FLOW MEASURING APPARATUS
Filed April 19, 1962 5 Sheets-Sheet 3
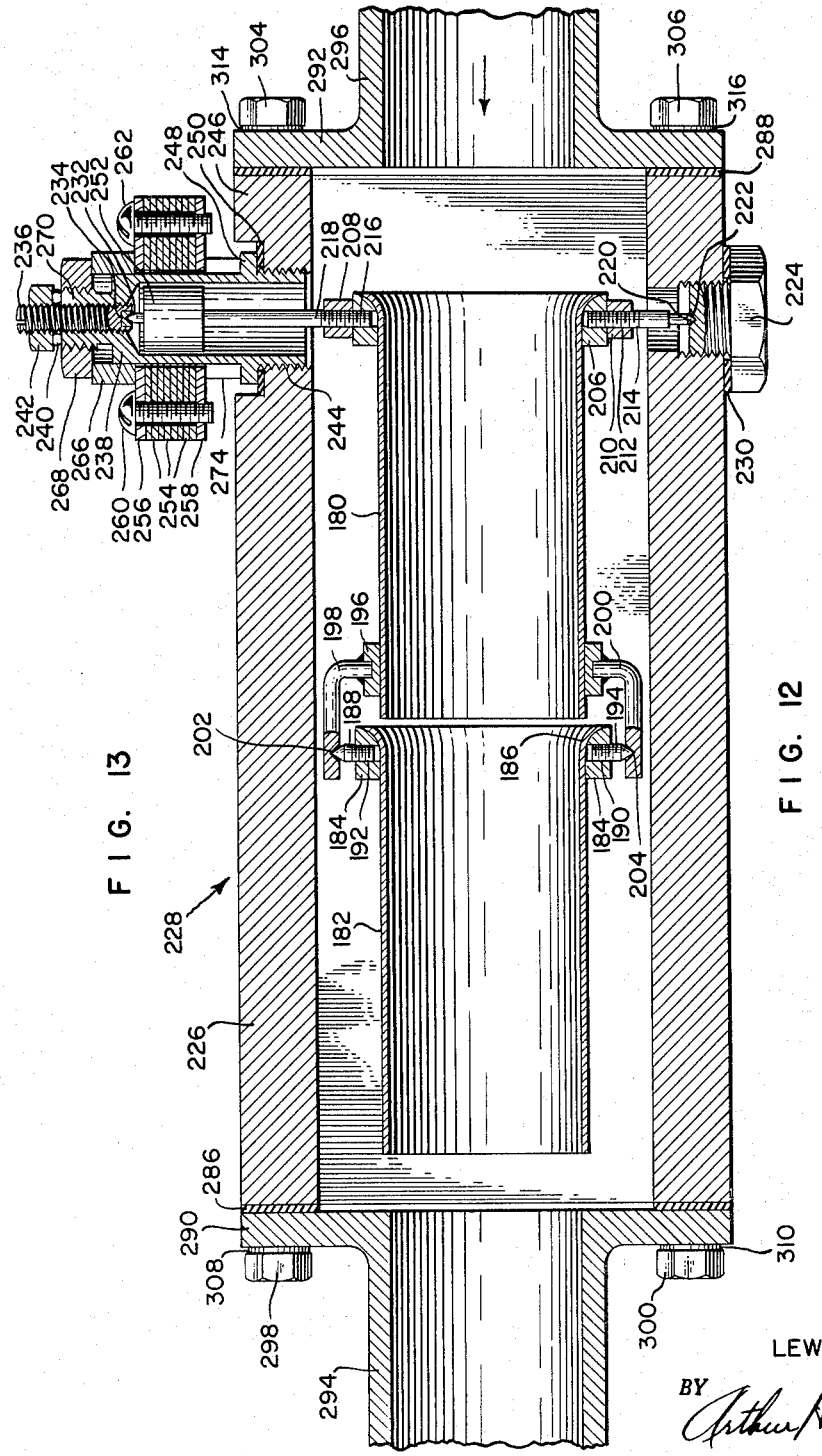
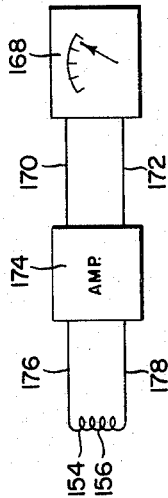
INVENTOR.
LEWIS A. MEDLAR
BY
ATTORNEY.

March 30, 1965 L. A. MEDLAR 3,175,399
FLUID FLOW MEASURING APPARATUS
Filed April 19, 1962 5 Sheets-Sheet 4
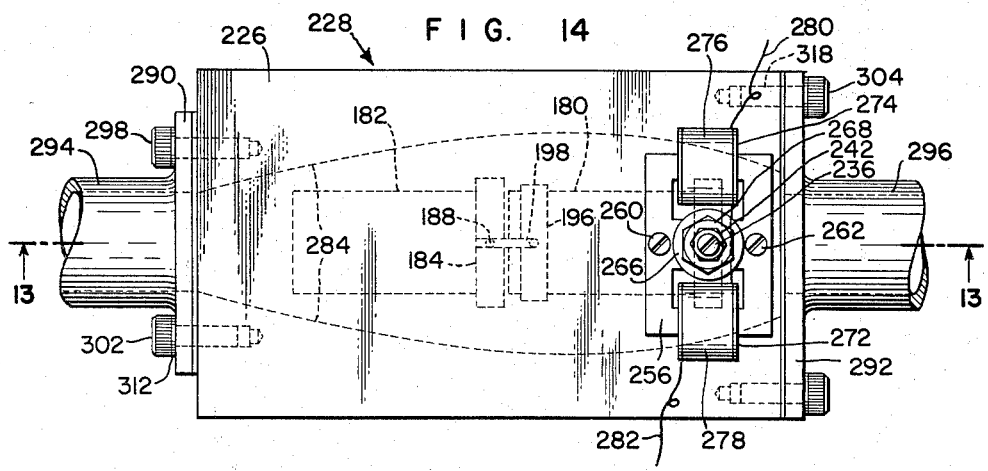
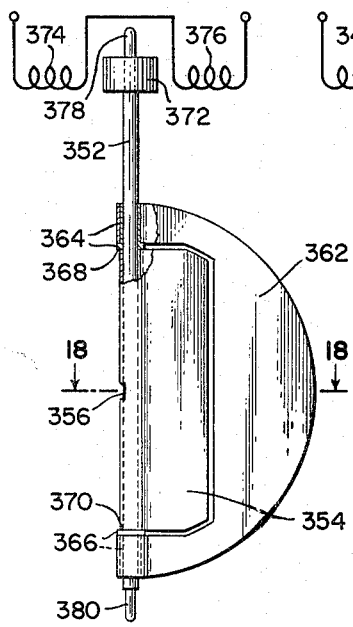
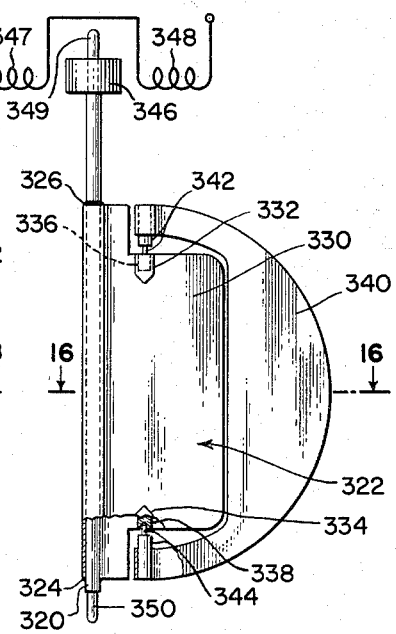
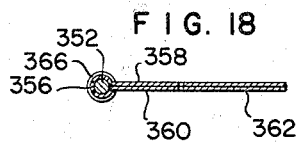
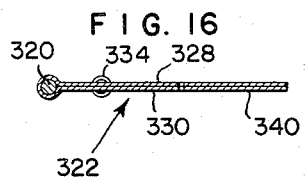
INVENTOR.
LEWIS A. MEDLAR
BY
ATTORNEY.

*INVENTOR.*
LEWIS A. MEDLAR
BY
ATTORNEY.

United States Patent Office 3,175,399
Patented Mar. 30, 1965

3,175,399
FLUID FLOW MEASURING APPARATUS
Lewis A. Medlar, Lansdale, Pa., assignor to
Honeywell Inc., a corporation of Delaware
Filed Apr. 19, 1962, Ser. No. 188,751
18 Claims. (Cl. 73—194)

The object of the present invention is to provide an apparatus of an inexpensive construction which will more accurately measure the flow of a fluid stream than has heretofore been possible to accomplish with presently available vibrating rod type flowmeters.

Prior to the present invention vibratable cylindrical rod-shaped flow sensing elements have been used in conduits to measure the flow of fluids passing therethrough. These cylindrical rod-shaped flow sensing elements have not been satisfactory in measuring the flow rate of a fluid because the cylindrical shape of these elements create certain undesired vortexes in the fluid under measurement that introduce non-linearities in the flow measurement.

More specifically, the present invention obviates the aforementioned non-linear flow measuring problem by providing a characteristically-shaped flow sensing element which will not introduce undesired vortexes into a flowing stream of fluid when the action of this stream is applied thereto.

It is a further object of the invention to provide a flow sensing element which will oscillate when brought into contact with the energy of a flowing stream of fluid at a frequency that is linearly proportional to the flow rate of the stream.

More specifically, it is another object of the present invention to disclose a flow rate sensing element which when surrounded by a fluid stream will jointly coact with the energy of the stream to oscillate the fluid and cause the flow sensing element to be oscillated in a sinuous, or, in a snake-like manner, at a frequency which is linearly proportional to the flow of the stream.

When the aforementioned oscillatable flow sensing element is employed in a stream of fluid that is passing through a confined passageway, such as a conduit, the sensing element will constrict the flow of fluid passing therethrough to a much less extent than that which is required by flowmeters that employ turbine wheels or orifice plates placed inside the conduit to make a flow measurement. Reduction of the space required by the flow sensing element in the aforementioned manner has the advantage of reducing the drop in pressure occurring across the meter to an unusually small value and this in turn allows the fluid to be pumped through the conduit in a more efficient and economical manner.

It is therefore another object of the present invention to provide an oscillatable flow element in a flow line that will enable a fluid to be pumped therethrough in a more efficient and economical manner than has therefore been possible with presently available type flowmeter constructions which make use of turbine wheels or orifice plates.

It is another object of the present invention to disclose one embodiment thereof which is preferably in the form of a thin oscillatable dual vane of low mass, which vane construction will be caused to oscillate at a frequency dependent upon the flow rate of the fluid stream into which it is immersed.

Another object of the invention is to provide still another type of flow sensing element which is of an oscillating dual tube construction which will oscillate at a frequency dependent upon the flow rate of the fluid in which it is immersed.

It is another object of the present invention to provide a means for indicating the oscillating frequency of either of the aforementioned flow measuring elements.

Another object of the invention is to employ a single dual vane or dual tube flowmeter which can be employed to measure the flow rate of a liquid, gas slurry or air suspended fine powder stream.

Whenever there is a large difference between the minimum and maximum rate of flow of a fluid stream it has heretofore been a common practice to employ a first flowmeter that is calibrated to take a flow measurement over one portion of the flow rate range and additional flowmeters calibrated to take the flow measurement over other portions of the flow rate range.

It is therefore another object of the invention to eliminate the need for costly multi-flowmeters of the aforementioned type by substituting instead a single flowmeter which is capable of accurately taking a flow rate measurement of a stream of fluid whose minimum to maximum flow rate extends over an unusually large range.

Figure 2:
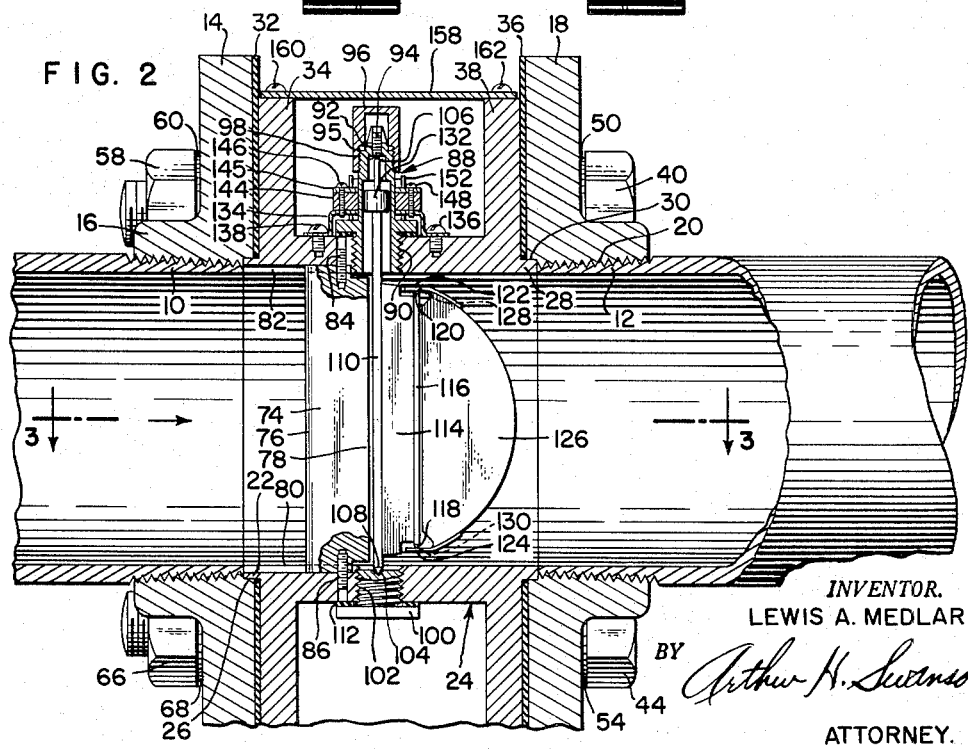
Figure 19:
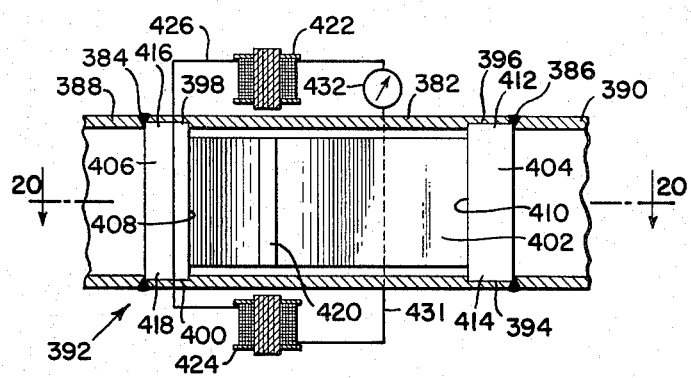
Figure 20:
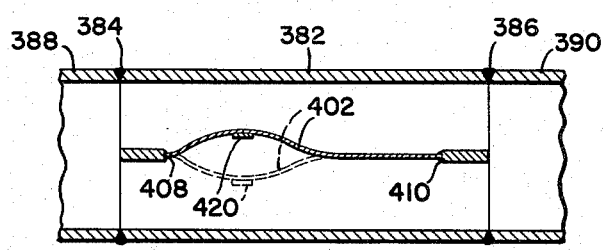
Figure 21:
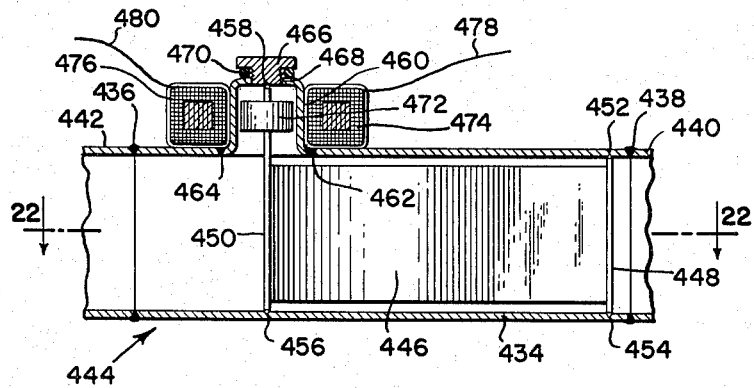
Figure 22:
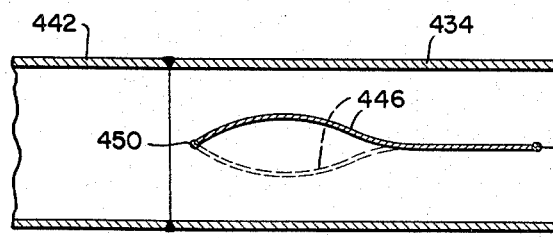

Of the drawing:
FIG. 1 shows an external view of the flowmeter installed in a flow conduit;
FIG. 2 shows a cross-sectional view taken along the line 2—2 of FIG. 1;
FIG. 3 shows a cross-sectional view taken along the line 3—3 of FIG. 2;
FIG. 4 to FIG. 11 disclose in sequence the various positions that the parts of the dual vane flow rate sensing element shown in FIGS. 1–3 will take while oscillations are being introduced into a fluid stream by the coaction which takes place between the dual vanes and the fluid stream that is brought into contact therewith;
FIG. 12 shows, in a block diagram form, how the measuring coils of the flowmeter are connected to a flow indicator;
FIG. 13 shows a cross-sectional view of a flowmeter which employs a pair of pivotally connected tubes which may be substituted for the pivoted dual vane arrangement shown in FIG. 2;
FIG. 14 shows a plan view of FIG. 13;
FIG. 15 shows a view of another oscillating vane and magnetic pickup coil flowmeter structure which can advantageously be employed in lieu of the oscillating vane and magnetic pickup coil flowmeter structure shown, e.g., FIG. 2;
FIG. 16 is a cross-sectional view taken along the line 16—16 of FIG. 15;
FIG. 17 shows still another view of a preferred oscillating vane and magnetic pickup coil flowmeter structure which can advantageously be employed in lieu of the oscillating vane and magnetic pickup coil flowmeter structure shown, e.g., FIG. 2, and
FIG. 18 is a cross-sectional view taken along line 18—18 of FIG. 17;
FIG. 19 shows another modified form of the flowmeter;
FIG. 20 is a cross-sectional view taken along the line 20—20 of FIG. 19;
FIG. 21 shows still another modified form of the flowmeter;
FIG. 22 is a cross-sectional view taken along the line 22—22 of FIG. 21.

Referring now to FIGS. 1 and 2 of the drawing in detail it can be seen that there is shown two spaced-apart threaded end portions 10, 12 of a flow conduit. A first cylindrical flange plate 14 is shown having a central portion 16 thereof threadedly mounted on the threaded end portion 10.

A second cylindrical flange plate 18 is shown having a central portion 20 threadedly mounted on the end portion 12.

FIG. 2 shows a left end cylindrical portion 22 of a hollow drum-shaped member 24 mounted in a cylindrical inner right end wall portion 26 of the flange plate 14. FIG. 2 also shows a right end cylindrical portion 28 of the hollow drum-shaped member 24 mounted in the inner left end wall portion 30 of the flange plate 18.

A first ring-shaped gasket 32 is positioned as shown in FIGS. 1 and 2 between the flange plate 14 and a cylindrical plate 34 which forms the left side of the drum-shaped member 24 and a second ring-shaped gasket 36 is shown positioned between the flange plate 18 and the cylindrical plate 38 which forms the right side of the drum-shaped member 24.

Each of the flanges 34, 38 of the drum-shaped member 24, the gaskets 32, 36 and the flange plates 14, 18 shown in FIGS. 1–3 are provided with four equally spaced-apart apertures to accommodate the passage therethrough of the shanks of four equally spaced-apart bolts 40, 42, 44, 46 in the manner shown for the bolt 40 in FIG. 2.

Each of the under-head portions of the bolts 40–46 are shown in FIGS. 1–3 provided with an associated spring washer 50, 52, 54, and 56. Each of the left end portions of these bolts 40–46 contains a threadedly mounted nut and an associated loosely mounted spring washer 58, 60, 62, 64, 66, 68 and 70, 72.

From the aforementioned description of the elements it can be seen that the drum-shaped member 24 can be fixedly mounted by means of the flange plates 14, 18 so that it will form a fluid-tight wall portion of a flow conduit that extends between the right end of the flow conduit 10 and the left end of the flow conduit 12. This is accomplished by first threadedly positioning the flange plates 14, 18 on their associated threaded end conduit portions 10, 12 in such positions that will allow the drum-shaped member and the gaskets 32, 36 mounted thereon to be inserted between these flange plates 14, 18. The flange plates 14, 18 are then moved toward one another along their associated threaded conduit portions 10, 12 to a position in which the right and left ends 22, 28 of the drum-shaped member 24 are brought into contact with the ends of the flow conduit portions 10, 12. When the flange plates 14, 18 are moved to this latter-mentioned position it can be seen that the gaskets will be placed in a partially compressed condition as shown in FIG. 2.

The shank of the bolts 40–46 are then passed through their associated apertures that are in the flange plate 10, gasket 36, flanges 34, 38, gasket 32 and flange plate 14 and the nuts 58, 62, 66, 70 associated with these bolts are tightened. This nut tightening action will compress their associated spring washers 60, 64, 68, 72 against the flange plate 14 and the spring washers 50, 52, 54 and 56 against the flange plate 18 to maintain the gaskets in their previously mentioned compressed condition.

FIGS. 2 and 3 of the drawing show a guard bar 74 having a rounded edge 76 at one end and a sharp pointed streamlined edge 78 at its opposite end. To retain the guard bar 74 in a fixed position within the drum-shaped member 24 there is provided in this member 24 a pair of oppositely positioned slots 80, 82 into which the ends of the guard bar are slidably positioned as shown in FIG. 2.

FIG. 2 also shows a pair of set screws 84, 86 which are threadedly connected to the member 24 and the guard bar 74 to maintain the ends of this bar in a fixed position along the axis of its associated slot 80, 82.

A hollow cylindrical bearing support member 88 is shown threadedly connected at its lower end 90 to one wall portion of the drum-shaped member 24. The upper end of this bearing support member 88 has a threaded wall portion 92 into which the shank of a set screw 94, that has a conical-shaped bearing surface 95 at its lower end, is threadedly mounted. A screw cap 96 is shown threadedly mounted on the upper external surface 98 of the bearing support member 88.

A shoulder screw 100 is threadedly connected at one of two opposite wall portions of the drum-shaped member 24. The center portion of the base of this screw is shown having a conical-shaped bearing surface 104 formed therein which diametrically opposes and is identical to the conical bearing surface formed in the lower end of the set screw 94.

FIG. 2 shows conical-shaped point pivot bearings 106, 108 formed on opposite ends of a pivot shaft 110 that are in pivotal engagement with associated and much larger conical-shaped surfaces 95, 104 that are formed in the ends of set screw 94 and shoulder screw 100.

When the shoulder screw 100 is tightened to the position shown in FIG. 2 a ring-shaped gasket 112 which surrounds the shank of the screw will be compressed against the drum-shaped member 24 to form a fluid-tight seal therewith.

Fixedly connected to the right end of the pivot shaft 110 there is shown a first vane 114. The right end of the vane 114 has fixedly mounted thereon a second pivot shaft 116 having conically-shaped point pivots 118, 120. The bent end portions 122, 124 of a second vane 126 are each provided with a conical-shaped aperture such as the apertures 128, 130 into which associated end portions of the point pivots 118, 120 are respectively mounted.

A permanent magnet 132 is shown fixedly mounted on the upper end of the pivot shaft 110 by means of swaging. An inverted substantially U-shaped support plate 134 having an aperture formed in a central wall portion thereof is shown surrounding the bearing support member 88. This plate 134 is fixedly connected to the drum-shaped member 24 by means of the screws 136, 138 which are shown passing through the slotted-out end-portions 140, 142 of the plate 134.

A hollow substantially rectangular-shaped ferrite plate 144 and a brass plate 145 are shown stacked on and retained in place on the top of the support plate 134 by means of two screws 146, 148.

FIG. 1 shows a first and second hollow spool 150, 152. Each of these spools 150, 152 contains an asssociated conductive coil of wire 154, 156 wound thereon which are located on opposite sides of the rectangular-shaped plates 144, 145. A bearing protecting plate 158 is shown attached by means of the screw connections 160, 162, 164, 166 to the drum-shaped member 24.

When the flowmeter is placed in a flow line as is best shown in FIGS. 2 and 3 and fluid flows in a left to right direction, as indicated by the flow direction arrows, the vanes 114, 126 will be sequentially displaced in a lateral direction about these pivots in the manner shown in FIGS. 4–11 of the drawing.

The oscillating movement of the vanes 114, 126 is brought about by the coaction which takes place between these vanes and the fluid stream. It has also been found that this pivoted dual vane construction permits an interaction to take place between a flow stream and the dual vane itself which will introduce a substantially sinuous motion into the vanes at a frequency which is proportional to the flow rate of the fluid stream.

An increase in the flow rate of the fluid stream will cause a reduction in angle through which the parts will be oscillated in their associated pivots. A decrease in the flow rate of the fluid stream will cause an increase in the angle through which the dual vane parts will be oscillated in their associated pivots.

When changes occur in the flow rate of the stream the vanes coaction with the fluid stream will thus cause the shaft 110 to be oscillated at a frequency that is always kept proportional to the flow rate of the fluid that is passing through the flow conduit. The permanent magnet 132 mounted on the shaft 110 is used to transmit the frequency at which the shaft 110 is rotating through the support member 88. The coils 154, 156 are connected in a series and positioned adjacent the magnet 132. As changes occur in the angular distance through which the magnet is being moved, by the previously-mentioned coaction of the fluid stream and vanes, this action will cause a variation in flux to occur in the coils 154, 156.

A frequency meter 168 is connected by way of conductors 170, 172, an amplifier 174 and electrical leads 176, 178 as shown in FIG. 1 to sense the resulting changes in frequency of the alternating voltage which is introduced into the coils 154, 156 by the oscillating magnet 132. The value indicated on the frequency meter 168 will thus be proportional to the frequency at which the dual vane part 114 is oscillating. The frequency at which the dual vane part 114 is caused to oscillate is always proportional to the flow rate of the fluid stream under measurement. The value which is indicated in the frequency meter 168 will therefore be an accurate linear value of the flow rate of the fluid stream.

The flowmeter construction shown on FIGS. 12 and 13 differ from the flowmeter construction shown in FIGS. 1–11. Primarily because the pair of oscillatable tubes 180, 182 have been substituted for the pair of oscillatable vanes 114, 126.

The tube 182 has a substantially ring-shaped member 184 fixedly connected by a force-fit or a welded connection, to its right flared end 186. Point pivot pins 188, 190 are shown having their non-pivot ends threadedly connected at 192, 194 which forms opposite threaded portions in the ring-shaped member 184.

A second ring-shaped member 196 is shown fixedly connected by a force-fit or welded connection, to another left end surface of the tube 180.

A first J-shaped rod 198 is fixedly connected at one of its ends by, for example, welding material to one surface of member 196. A second J-shaped rod 200 is fixedly connected to one of its ends by, for example, welding material to an opposite surface of member 196.

The other ends of the respective first and second rods 198, 200 are shown having conical surfaces 202, 204. The apex formed at the pointed ends of the pivot pins 188, 190 are pivotally mounted in point contact as shown with associated conical surfaces 202, 204.

The right end of the tube 180 is provided with a ring-shaped member 206 that is constructed and mounted on tube 180 in the same manner as the previously-mentioned ring-shaped member 184 is constructed and mounted on its associated tube 182.

FIG. 13 also shows two nuts 208, 210 integrally connected by means of welding material to diametrically opposite portions of the ring-shaped member 206.

An end portion 212 of a first pivot pin 214 is shown threadedly connected to the ring-shaped member 206 and nut 210. In a similar manner an end portion 216 of a second pivot pin 2-18 is shown threadedly connected to an opposite portion of a ring-shaped member 206 and nut 208.

FIG. 13 of the drawing shows the other end portion of the pivot pin 212 to be of a smaller diameter than its threaded end and central portions. The end of the pin 212 having a smaller diameter is shown possessing a conical-shaped point 220 which together with the conical bearing surface 222 formed in the cap screws 224 forms a point bearing.

The screw 224 is threadedly mounted as shown to one of the walls 226 of a housing 228. When the screw is in its assembled position as shown in FIG. 13 the ring-shaped gasket 230 will be compressed against the wall 226 to form a fluid tight seal therewith.

FIG. 13 shows the upper end of the pivot pin 218 ending in a conical-shaped point 232 which together with the conical-shaped bearing block 234 that is shown fixedly retained within the end of a set screw 236, forms a second point pivot bearing that is diametrically opposite to the first previously-mentioned described point pivot bearing 220, 222.

The set screw 236 is shown in FIG. 13 as being threadedly retained in a bearing support member 238 by means of the ring-shaped gasket 240 and the nut 242.

The other end of the bearing support member 238 is threadedly mounted as shown at 244 to a second wall portion 246 of the housing 228. When assembled as shown in FIG. 13 the shoulder portion 248 will compress gasket 250 to form a fluid type joint between the housing 228 and the wall portion 246. A permanent magnet 252 is shown fixedly mounted on the upper end of the pivot pin 218. A plurality of hollow substantially rectangular-shaped core laminations 254 together with two outer insulator plates 256, 258 are joined together by means of two screw connections 260, 262. The plates 254 are shown adjacent to the magnet 252 and extending across the entire length of the magnet 252. To maintain plates 254–258 in a fixed position from the bearing support member 238 there is provided a hollow cylindrically-shaped support 266 and a nut 268 and threaded surface connection 270 along which the nut can be moved to its tightened position as shown in FIG. 13.

FIG. 14 shows a first and second hollow spool 272, 274 the sides of which are shown supported on the housing 228. Each of these spools 272, 274 contain an associated conductive wire coil 276, 278, which are located on opposite sides of the rectangular-shaped plates 254–258. The coils of wire 276, 278 are connected in series and their leads 280, 282 are connected to an amplifier and in the same manner as that previously described for the flow rate measuring circuit of the dual vane flowmeter that is shown in FIG. 12.

The housing 228 is preferably made of a single piece construction as shown or can be made of a two piece construction in which longitudinal top and bottom half portions of the casing 23 are joined together by means of tie bolts. In either construction the inner side wall of the housing 284 will be located at a position that is sufficiently far enough away from the central longitudinal portion of the tubes 180, 182 that the tubes will never be brought into contact with the housing 284 when it is oscillated through its maximum angle from one side of the housing to the other by the flow of fluid passing therethrough. A pair of gaskets 286, 288 and the flanges 290, 292 are shown in FIGS. 13, 14 positioned between the respective right and left end of the housing 228. After the housing 228 is assembled as shown in FIG. 13 and 14 a fluid tight connection is then made between the flanges 290 and 292 of the flow conduits 294, 296 and the right and left end of the casing 228. This is accomplished by inserting each of a plurality of equally spaced apart tap bolts, for example, 298, 300, 302, 304 and 306 through their associated gaskets 286, 288 and thence into tight threaded engagement with the wall forming associated tapped apertures in the housing such as is shown in 318 in FIG. 14.

FIG. 15 shows a pivot shaft 320. A single vane 322 is shown wrapped about the shaft 320 and welded thereto by means of welding material at 324, 326.

After the plate 322, shown in FIG. 16, which forms a first or main vane has been wrapped about the shaft 320 its two end portions 328, 330 are then brought together and cylindrical apertures are formed by the walls 332, 334. The two end portions 328, 330 are then resistance welded together.

A first bearing plate 336 containing a cone-shaped bearing surface is retained within the wall 332 and a second bearing plate 338 containing a cone-shaped bearing surface is retained within the wall 334.

The inner left end of the second or tail vane 340 is provided with two cone-shaped point pivots 342, 344 which are each press fitted into assembled point contact positions with associated cone-shaped bearing surfaces in the bearing plate 336, 338 as shown in FIG. 15.

The upper end of the shaft 320 is shown having a permanent magnet 346 mounted thereon for free oscillation with the vane 322.

The ends of the two coils 347, 348 shown in FIG. 16 are connected to a frequency meter by way of an amplifier in the same manner as the coils 154, 156 are connected to the amplifier 174 and voltmeter 168 in FIG. 12 which has been previously described.

The hemispherical ends at 349, 350 of the shaft 320 are preferably made of any hard bearing material, e.g., a suitable polished chrome-moly alloy steel, and are assembled in bearings connected to the wall of a flow conduit in the manner similar to that shown, e.g., for the bearing 104, 108 in FIG. 2.

FIG. 17 shows a pivoted shaft 352. A single plate 354 is shown wrapped about the shaft 352.

A wall portion 356 forms a slot in the plate 354 and the edges thereof are fixedly connected by suitable welding material to the shaft 352. After the plate 354 which forms a first or main vane has been wrapped about the shaft 352 as is best shown in FIG. 18 two end portions 358, 360 are brought together and are resistance welded.

It should be understood that before assembling the main vane 354 and tail vane 362 on the shaft 352 the inside diameter of the sleeve bearings, 364, 366, which are press fitted into the tail vane 362, are aligned with associated open end portions 368, 370 of the plate 354.

When the main and tail vanes 354, 362 are aligned in this manner the entire assembly is slid down on the shaft 352 and the main vane 354 is welded at 356 to the shaft 352.

One end of the shaft 352 is shown containing a permanent magnet 372 fixedly connected thereto in a manner similar to the way magnet 132 shown in FIG. 2 of the drawing is connected to its associated pivot shaft 110.

The ends of the two coils 374, 376 shown in FIG. 17 are connected to a frequency meter by way of an amplifier in the same manner as the coils 154, 156 are connected to the amplifier 174 and frequency meter 168 in FIG. 12 which has been previously described.

The hemispherical ends 378, 380 of the shaft 352 are preferably made of a suitable polished hard bearing material and are assembled in bearings of a flow conduit in the manner similar to that shown, e.g., for the bearing 104, 108, in FIG. 2.

FIG. 19 shows another different modified form of the flowmeter than those previously described. This flowmeter is placed within a section of pipe 382 that is shown inserted and welded at 384, 386 between two opposing open end portions 388, 390 of a flow conduit 392. The right and left ends of the insertable pipe section are shown having slotted key-shaped wall surfaces at 394, 396; 398, 400.

A vane plate member 402 which is made of a flexible metallic or plastic material extends between two struts 404, 406 and is welded thereto at 408, 410. The struts 404, 406 may be readily placed into their assembled position as is shown in FIGS. 19 and 20 by holding, e.g., the strut 404 in a fixed position and by then twisting the strut 406 and the flexible vane plate member 402 attached thereto so that the last-mentioned strut can be moved through the pipe section 382 in a right-to-left direction.

In the aforementioned manner the opposite end portions 412, 414 of the strut 404 can be moved into engagement with associated key-shaped slotted wall surfaces 394, 396 formed in the pipe section 382 and the opposite end portions 416, 418 can be moved into engagement with their associated slotted wall surfaces 398, 400.

The right and left ends of the struts 404, 406 are then simultaneously compressed and their end portions 412, 414 are fixedly connected by welding material to the sides of the associated key-shaped wall surfaces 394–400.

When the struts 404, 406 are assembled in the aforementioned position the flexible vane plate member 402 will be forced into the buckled solid line position shown in FIG. 20.

The flexible vane plate 402 has a magnetized material 420 fixedly attached thereto which is of a strip shape configuration.

A pair of magnetic pickup coil units 422, 424 are shown serially connected to one another by means of the conductor 426.

FIG. 19 shows how a frequency meter can be electrically connected by means of an electrical conductor 431 across the conductors 428, 430 which meter can be calibrated to measure the frequency at which the flexible vane plate 402 is caused to oscillate by the previously-described coaction that take places between this vane plate 402 and the fluid under measurement that is flowing through the pipe section 382 of the flow conduit 392. In other words, the frequency at which the vane plate is moved from its solid line position to its dotted line position as shown in FIG. 20 is the measurement which is indicated on the frequency meter 432.

FIGS. 21, 22 show another different modified form of the flowmeter than those previously described. This flowmeter is placed within a section of pipe 434 that is shown inserted and welded at 436, 438 between two opposing open end portions 440, 442 of the flow conduit 444.

A vane plate member 446 which is made of a flexible metallic of plastic material is shown extending between two point pivot shafts 448, 450.

The point pivot shafts 448, 450 may be readily placed into their assembled cone-shaped pivots 452, 454; 456, 458 as is shown in FIG. 21 by first rotating, e.g., the shaft 448 end over end with respect to the shaft 450. As this rotation takes place the flexible vane 446 will cause the ends of the shaft 448, 450 to be moved to a position in which their longitudinal center lines are brought substantially into alignment with the longitudinal center line of the pipe section 434. When the shafts 448, 450 are placed in this last-mentioned position they can then be readily moved through the shaft, rotated back to their original position and into their pivoted position shown in FIG. 21. When the ends of the point pivot shafts 448, 450 are snapped into their pivoted position as shown in FIG. 21 the vane plate member 446 will be in a buckled position as shown in FIG. 22 due to the fact that its length is greater than the length that exists between the pivot shafts 448, 450 to which the vane plate member is fixedly attached by a suitable welding material.

A cylindrical cap 460 is shown attached by welding material at 462 to the wall 464 which forms an aperture in the pipe section 434. A shoulder bolt 466 is shown threadedly connected at 468 to an upper central threaded wall portion of the cap 460. A ring-shaped seal 470 is employed to form a fluid-type joint between the bolt 466 and the cap 460 when the bolt 466 is tightened to the position shown in FIG. 21. The end of the shaft 450 is shown containing a permanent magnet 472 fixedly connected thereto in a manner similar to the way magnet 132 shown in FIG. 2 of the drawing is connected to its associated pivot shaft 110.

Two magnetic pickup coils 474, 476 are connected in series with one another and are shown having conductors 478, 480 leading therefrom which are connected to a frequency meter by way of an amplifier, not shown, in the same manner as the coils 154, 156 are connected to the amplifier 174 and frequency meter 168 in FIG. 12 which has been previously described.

From the aforementioned description of each of the many different modified forms of the flowmeter structure disclosed herein it can be seen that there has in each instance been disclosed a flow rate sensing element which when surrounded by a fluid stream will jointly coact with the energy of the stream to oscillate the fluid and cause the flow sensing element to be oscillated in a sinuous, or in a snake-like manner, at a frequency which is linearly proportional to the flow of the stream.

What is claimed is:

1. A flowmeter to measure the flow rate of a fluid stream flowing in an upstream to downstream direction, comprising a flow sensing means having at least one elongated deflectable member extending between an upstream and downstream portion of the flowing stream, the deflectable member being connected for interacting oscillating movement in a sinuous manner with the fluid on a pivot axis that is positioned in an upstream portion of the fluid stream that is transverse to the direction of flow, and a means associated with the deflectable member to measure the flow rate of the fluid stream in terms of the frequency at which the deflectable member is oscillated by its interaction with the fluid.

2. The flowmeter defined in claim 1, wherein the deflectable member is comprised of two members that are of a vane-shaped configuration.

3. The flowmeter as defined in claim 1, wherein the deflectable member is comprised of two pivotally mounted vanes connected in series with one another.

4. The flowmeter as defined in claim 1, wherein the deflectable member is comprised of two members that are of a tube-shaped configuration.

5. The flowmeter as defined in claim 1, wherein the deflectable member is comprised of two pivotally mounted tubes connected in series with one another.

6. The flowmeter defined in claim 1, wherein an electro-mechanical responsive means is employed to measure the frequency at which the deflectable member is oscillated about the pivot axis.

7. The flowmeter as defined in claim 1, wherein the deflectable member is comprised of a buckled, flexible plate.

8. The flowmeter as defined in claim 1, wherein the deflectable member is comprised of a buckled, flexible plate that has its ends pivotally mounted in a flow conduit which surrounds the fluid stream under measurement.

9. A flowmeter as defined in claim 1, wherein the deflectable member is comprised of a buckled, flexible plate having its ends mounted in a flow conduit which surrounds the fluid stream under measurement.

10. The flowmeter as defined in claim 1, wherein the deflectable member is comprised of a first vane having a shaft that is pivotally mounted in a flow conduit which surrounds the fluid stream and a second vane having an upstream edge portion thereof pivotally mounted on an outer edge portion of the first vane that is between its shaft and its downstream end.

11. The flowmeter as defined in claim 1, wherein the deflectable member is comprised of a first vane having a shaft that is adapted to be pivotally mounted in a flow conduit which surrounds the fluid stream on the transverse axis and a second vane spaced from said first vane and pivotally mounted on the same common pivoted axis as the first vane.

12. The flowmeter as defined in claim 1, wherein the deflectable member is comprised of a first vane having a shaft that is pivotally mounted in a flow conduit which surrounds the fluid stream on the transverse axis and second vane pivotally mounted on outer portions of the first vane.

13. The flowmeter as defined in claim 1, wherein the deflectable member is comprised of a first vane having a shaft that is pivotally mounted in a flow conduit which surroundsh the fluid stream on the transverse axis and a second vane of a substantially U-shaped construction having the upper leg portions thereof pivotally mounted on outer edge portions of the first vane that are between its shaft and its upstream end.

14. A flowmeter sensor for detecting the flow rate of a fluid stream, comprising an articulated pivoted flow sensing vane disposed within and coacting with an elongated longitudinal portion of the fluid stream to effect the detection of resulting transverse vibrations in said fluid stream that are at a frequency proportional to its rate of flow.

15. A flowmeter sensor for detecting the flow rate of a fluid stream, comprising an articulated pivoted flow sensing vane disposed within and coacting with an elongated longitudinal portion of the fluid stream to effect the introduction and detection of resulting transverse vibrations in said fluid stream that are at a frequency proportional to its rate of flow.

16. A flowmeter to measure the flow rate of a fluid stream flowing in an upstream to downstream direction, comprising a wall member forming an open elongated passageway between the upstream and downstream portions of the fluid under measurement, a flow sensing member extending between upstream and downstream portions of the stream, the flow sensing member being interconnected and in interacting physical contact with the fluid in the passageway, said interaction of said member and stream being operable to introduce a sinuous oscillating movement into said flow sensing member, one end of the flow sensing member being mounted for oscillating movement about a pivot means in said wall member whose axis is transverse to the direction of flow and which is positioned at an upstream end portion of the flow sensing member, and the resulting interaction taking place between the flow sensing member and the fluid stream being operable to cause the frequency at which the fluid sensing member oscillates about the axis of the pivot means to be linearly proportional to the flow rate of the stream.

17. A flowmeter to measure the flow rate of a fluid stream, comprising an articulated deflectable flow sensing vane adapted for insertion in the fluid stream, said vane having substantially the same natural period of oscillation for one preselected flow rate of the fluid stream and a different natural period of oscillation for any other flow rate of the stream.

18. A flowmeter to measure the flow rate of a fluid stream, comprising an articulated flow sensing element pivotally connected for interacting movement in the fluid stream, and the interaction of the articulated element with the flow stream being operable to introduce a substantially sinuous motion in the element whose frequency is proportional to the flow rate of the fluid stream.

References Cited in the file of this patent

UNITED STATES PATENTS

| 1,935,445 | Heinz | Nov. 14, 1933 |
| 2,869,366 | Nitikman | Jan. 20, 1959 |
| 3,116,639 | Bird | Jan. 7, 1964 |

FOREIGN PATENTS

| 687,354 | Germany | Jan. 29, 1940 |
| 587,860 | Great Britain | May 7, 1947 |